United States Patent
Lin et al.

(10) Patent No.: US 6,954,868 B2
(45) Date of Patent: Oct. 11, 2005

(54) APPARATUS AND METHOD FOR DETECTION FOR USE IN A TOUCH-SENSITIVE PAD

(75) Inventors: Hwan-Rong Lin, Changhua (TW); Hung-Chang Hsu, Shinjuang (TW)

(73) Assignee: Darfon Electronics Corp., Taoyuan (TW)

( * ) Notice: Subject to any disclaimer, the term of this patent is extended or adjusted under 35 U.S.C. 154(b) by 644 days.

(21) Appl. No.: 10/032,036

(22) Filed: Dec. 31, 2001

(65) Prior Publication Data

US 2002/0091952 A1 Jul. 11, 2002

(30) Foreign Application Priority Data

Jan. 5, 2001 (TW) ........................ 90100315 A

(51) Int. Cl.$^7$ ............................. G06F 1/32; G09G 5/00
(52) U.S. Cl. ...................... 713/324; 713/300; 713/323; 713/320; 345/173
(58) Field of Search ..................... 713/300, 320, 713/322, 323, 324; 345/173

(56) References Cited

U.S. PATENT DOCUMENTS

| | | | | |
|---|---|---|---|---|
| 5,451,724 A | * | 9/1995 | Nakazawa et al. | 345/173 |
| 6,049,885 A | * | 4/2000 | Gibson et al. | 713/324 |
| 6,054,979 A | * | 4/2000 | Sellers | 345/173 |
| 6,359,616 B1 | * | 3/2002 | Ogura et al. | 345/173 |
| 6,529,530 B1 | * | 3/2003 | Ichii et al. | 370/537 |

* cited by examiner

Primary Examiner—Lynne H. Browne
Assistant Examiner—James K. Trujillo
(74) Attorney, Agent, or Firm—Rabin & Berdo, P.C.

(57) ABSTRACT

A detection apparatus for use in a touch pad, for detecting the coordinates indicated by a user on the touch pad and the behavior of the user on the touch pad. The touch pad includes an X-layer and a Y-layer, and the X- and Y-layers are planar resistors. The detection apparatus has a sleep mode and an operative mode. When the user touches the touch pad, the X- and Y-layers are electrically coupled at a touch point. The detection apparatus includes a central processor, a coordinate detecting unit, an analog-to-digital converting unit, and a wake-up unit. The coordinate detecting unit is used to determine and output an X-coordinate voltage and a Y-coordinate voltage, wherein the X- and Y-coordinate voltages correspond to the touch point. The analog-to-digital converting unit is used to convert the X- and Y-coordinate voltages into an X-coordinate and a Y-coordinate, and to output the X- and Y-coordinate. The central processor is used to control the coordinate detecting unit and the analog-to-digital converting unit. When the detection apparatus is in the sleep mode and the user touches the touch pad, the wake-up unit outputs a wake-up signal of a first level so that the detection apparatus changes from the sleep mode to the operative mode; then, the central processor sends the wake-up control signal so that the wake-up signal changes to a second level.

8 Claims, 5 Drawing Sheets

US 6,954,868 B2

APPARATUS AND METHOD FOR DETECTION FOR USE IN A TOUCH-SENSITIVE PAD

This application incorporates by reference of Taiwan application Serial No. 90100315, filed on Jan. 5, 2001.

BACKGROUND OF THE INVENTION

1. Field of the Invention

The invention relates in general to an apparatus for detection for use in a touch-sensitive pad and a method therefor, and more particularly to an apparatus for detection for use in a wireless touch-sensitive pad operative with power saving and a method therefor.

2. Description of the Related Art

Computer systems nowadays employ a lot of peripheral devices. For a computer system employing many peripheral devices, the required cables and lines for connecting the peripheral devices to the computer system are inconvenient to be arranged. In order to reduce number of the cables and lines for connection and make the peripheral devices capable of being moved easily and used in a distance from the computer system, many kinds of peripheral devices are redesigned to be wireless, resulting in wireless peripheral devices, such as a wireless keyboard and a wireless mouse, available to the market. If touch-sensitive pads, or simply called touch pads, are substituted for conventional mice, the touch pads and keyboards can be further integrated into one device, resulting in a compact peripheral device with reduced number of cables and lines, and convenient mobile capability.

Power dissipation is an important problem to be resolved. The power dissipated by a wireless device should be as less as possible because the wireless device cannot gain power externally but requires batteries internally equipped with it. Although touch pads are generally of capacitor-type, their dissipation power in a sleep mode is still substantially large, about 800 $\mu$. Another type of touch pad is resistive touch pad. A resistive touch pad is illustrated in FIG. 1. A touch pad 100 includes an X layer 102 and a Y layer 104. The X layer 102 and the Y layer 104 are planar resistors and the X layer 102 has no contact with the Y layer 104 under natural states. On the X layer 102, the value of resistance varies with the X-axis, but not with the Y-axis. On the Y layer 104, the value of resistance varies with the Y-axis, but not with the X-axis. When a user touches the touch pad 100, the X layer 102 will be in contact with the Y layer 104 at a touching point. For example, in FIG. 1, a point P1 on the Y layer 104 and a point P2 on the X layer 102 make contact with each other at a touching point as the user touches the touch pad 100. The coordinates of the touching point varies as the user is touching the touch pad 100 with movement on the touch pad 100. The touch pad 100 employs a detection device for detecting the coordinates of the touching point. In order to reduce the dissipation power of the touch pad, the reduction in the dissipation power of the detection device to a minimum level becomes one of the important tasks of the industry to be taken efforts in.

SUMMARY OF THE INVENTION

It is therefore an object of the invention to provide a detection apparatus for use in a touch-sensitive pad and a detection method therefor. By the invention, the coordinates of points indicated by a user on the touch pad and the behavior of the moving points can be detected. In addition, the invention has a reducing effect on dissipation power.

The invention achieves the above-identified object by providing a detection apparatus for use in a touch pad, for detecting the coordinates indicated by a user on the touch pad and the behavior of the user on the touch pad. The touch pad includes an X-layer and a Y-layer, and the X- and Y-layers are planar resistors. The detection apparatus has a sleep mode and an operative mode. When the user touches the touch pad, the X- and Y-layers are electrically coupled at a touch point. The detection apparatus includes a central processor, a coordinate detecting unit, an analog-to-digital converting unit, and a wake-up unit. The central processor is used for outputting at least a coordinate control signal, at least a conversion control signal and a wake-up control signal. The coordinate detecting unit is coupled to a first terminal of the X-layer, a second terminal of the X-layer, a first terminal of the Y-layer, a second terminal of the Y-layer, and the central processor. The coordinate detecting unit is used for receiving the coordinate signal so as to determine and output an X-coordinate voltage and a Y-coordinate voltage, wherein the X- and Y-coordinate voltages correspond to the touch point. The analog-to-digital converting unit is coupled to the coordinate detecting unit and the central processor, for receiving the conversion control signal so as to convert the X- and Y-coordinate voltages into an X-coordinate and a Y-coordinate, and to output the X- and Y-coordinate. The wake-up unit is coupled to the coordinate detecting unit and the central processor. As the detection apparatus is in the sleep mode, when the user touches the touch pad and the X- and Y-layers are in contact with each other, the wake-up unit outputs a wake-up signal of a first level so that the detection apparatus changes from the sleep mode to the operative mode; then, the central processor sends the wake-up control signal so that the wake-up signal changes to a second level.

The invention achieves the above-identified object by providing a detection method for use in a detection device for a touch pad so as to detect an action which a user performs on the touch pad by a touch point on the touch pad. The action is one of a set of actions including a movement, a click, a double click, and a drag motion. The movement indicates that the user causes the touch point to move from one position to another position. The click, composed of a depression event and a release event, indicates that the user touches the touch pad for one time. The double click indicates that the user touches the touch pad for two times within an action time. The drag motion indicates that the user performs the click and then the movement within the action time. The touch pad has a sleep mode and an operative mode. When the touch pad is in an initial state, the touch pad is configured to be in the sleep mode while k is set to one and D is set to zero, where k and D are positive integers. When the user touches the touch pad, the touch pad changes from the sleep mode to the operative mode. When the touch pad is in the operative mode, the detection method includes the following steps. (a) It is determined whether the touch pad is touched; if so, the method proceeds to step (b); otherwise, the method proceeds to step (j). (b) It is determined whether the touch pad is connected properly; if so, the method proceeds to step (c); otherwise, the proceeds to step (h). (c) It is determined whether k is greater than a predetermined number; if so, the method proceeds to step (d); otherwise, the method proceeds to step (f). (d) It is determined whether D is equal to one; if so, the method proceeds to step (e); otherwise, the method proceeds to step (i). (e) It is to announce that the action by the user is the drag motion and the method proceeds to step (f). (f) A sampling time is waited for and the method proceeds to step (g). (g) k is incremented by one and the method proceeds to step (a). (h) k is set to one and D to zero, and the touch pad is caused to enter the sleep mode. (i) It is to announce that the action is the movement, and the method proceeds to step (f). (j) It is determined whether k is greater than one and less than the predetermined number; if so, the method proceeds to step (k); otherwise, the method proceeds to step (h). (k) It is determined whether D is equal to zero; if so, the method proceeds to step (l); otherwise, the method proceeds to step (m). (l) It is to announce the depression event and to set k to one and D to one, and the method proceeds to step (n). (m) It is to announce that the action is the double click, and the method proceeds to step (h). (n) It is to start to clock and the method proceeds to step (o). (o) It is determined whether the action time is reached; if so, the method proceeds to step (q); otherwise, the method proceeds to step (p). (p) It is determined whether the user touches the touch pad; if so, the method proceeds to step (a); otherwise, the method proceeds to step (o). (q) It is to announce the release event, and the method proceeds to step (h).

Other objects, features, and advantages of the invention will become apparent from the following detailed description of the preferred but non-limiting embodiments. The following description is made with reference to accompanying drawings described.

DETAILED DESCRIPTION OF THE INVENTION

Figure 1:
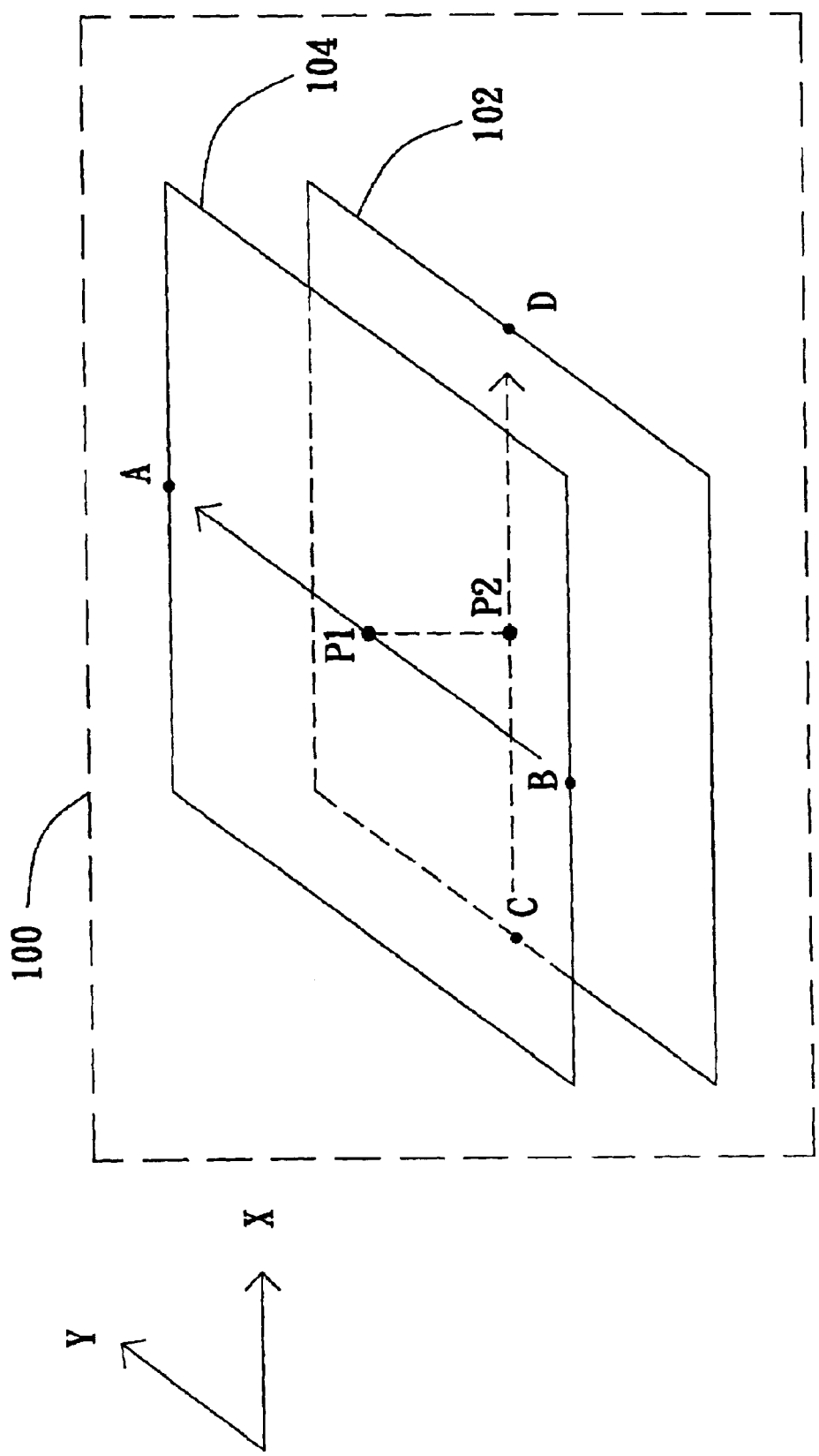
FIG. 1 illustrates a resistive touch pad.
Figure 2:
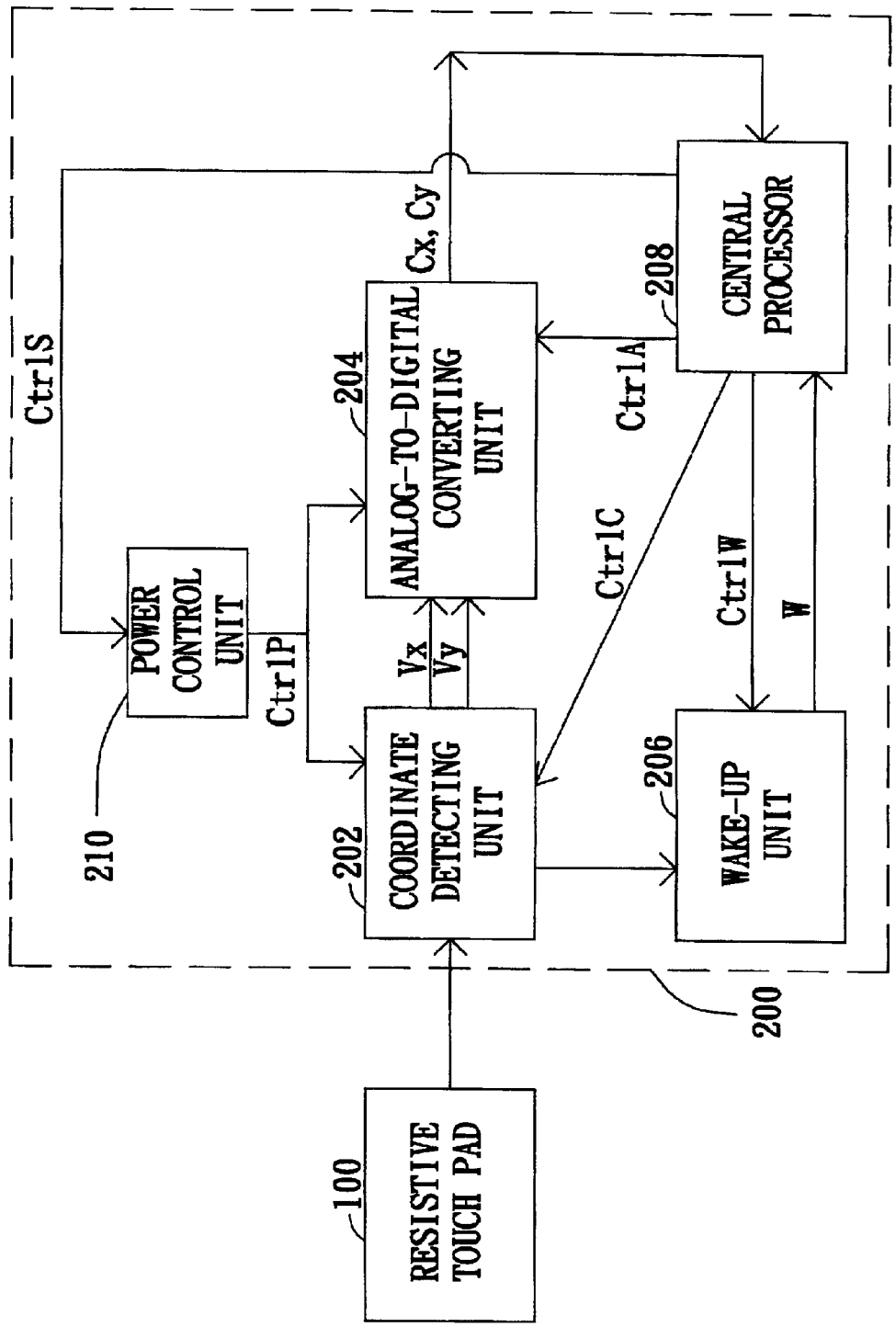
FIG. 2 is a block diagram illustrating a touch pad, which employs an apparatus for detection according to a preferred embodiment of the invention.

A detection apparatus 200 for a touch pad 100 is illustrated in FIG. 2, according to a preferred embodiment of the invention in block diagram form. The touch pad 100 is the resistant touch pad shown in FIG. 1. The detection apparatus 200 for the touch pad 100 is used to detect coordinates indicated by a user on the touch pad 100. The detection apparatus 200 for the touch pad 100 includes a coordinate detecting unit 202, an analog-to-digital converting unit 204, a wake-up unit 206, a central processor 208, and a power control unit 210. The detection apparatus 200 has a sleep mode and an operative mode. When the detection apparatus 200 enters the sleep mode, the detection apparatus 200 can save the dissipated power. When the detection apparatus 200 is in the operative mode, the detection apparatus 200 is used to detect the coordinates indicated by the user on the touch pad 100.

The coordinate detecting unit 202 is coupled to the touch pad 100 and is used for detecting the coordinate signal so as to determine an X-coordinate voltage Vx and a Y-coordinate voltage Vy, wherein the X- and Y-coordinate voltages correspond to a touch point by the touching of the user on the touch pad 100. The X-coordinate voltage Vx is the voltage across the touch point and a terminal C of X-layer 102 while the Y-coordinate voltage Vy is the voltage across the touch point and a terminal B of X-layer 102, wherein the terminals B and C can be the terminals of lower voltages among the terminals of the corresponding X- and Y layer, respectively.

The analog-to-digital converting unit 204 is coupled to the coordinate detecting unit 202 and is employed to convert the X-coordinate voltage Vx and Y-coordinate voltage Vy into an X-coordinate and a Y-coordinate, and to output the X-coordinate and Y-coordinate.

The central processor 208 is coupled to the power control unit 210, the coordinate detecting unit 202, and the analog-to-digital converting unit 204. The central processor 208 outputs a power control signal CtrlS, a coordinate control signal CtrlC, a conversion control signal CtrLA, and a wake-up control signal CtrlW, so as to control the power control unit 210, the coordinate detecting unit 202, the analog-to-digital converting unit 204, and the wake-up unit 206, respectively. The central processor 208 is, for example, a single chip controller. The coordinate control signal CtrlC includes coordinate control signals CtrlC1, CtrlC2, CtrlC3, and CtrlC4. The conversion control signal CtrlA includes conversion control signals CtrlA1, CtrlA2, and CtrlA3.

The power control unit 210 is coupled to the central processor 208, the coordinate detecting unit 202, and the analog-to-digital converting unit 204. The power control unit 210 is used to output a power termination signal CtrlP. When the detection apparatus 200 changes from the operative mode to the sleep mode, the power control unit 210 outputs the power termination signal CtrlP to stop a direct current (DC) voltage source from powering the coordinate detecting unit 202 and the analog-to-digital converting unit 204, thereby saving the power dissipated.

The wake-up unit 206 is coupled to the coordinate detecting unit 206 and the central processor 208. As the detection apparatus 200 is in the sleep mode, when the user touches the touch pad 100 so that the X-layer 102 and Y-layer 104 are in contact with each other, the wake-up unit 206 outputs a wake-up signal W of a first level to the central processor 208. After the central processor 208 wakes up, the detection apparatus 200 changes from the sleep mode to the operative mode under the control of the central processor 208. When the detection apparatus 200 is in the operative mode, the wake-up unit outputs a wake-up signal of a second level. The first level indicates a high-level voltage while the second level indicates a low-level voltage.

Figure 3:
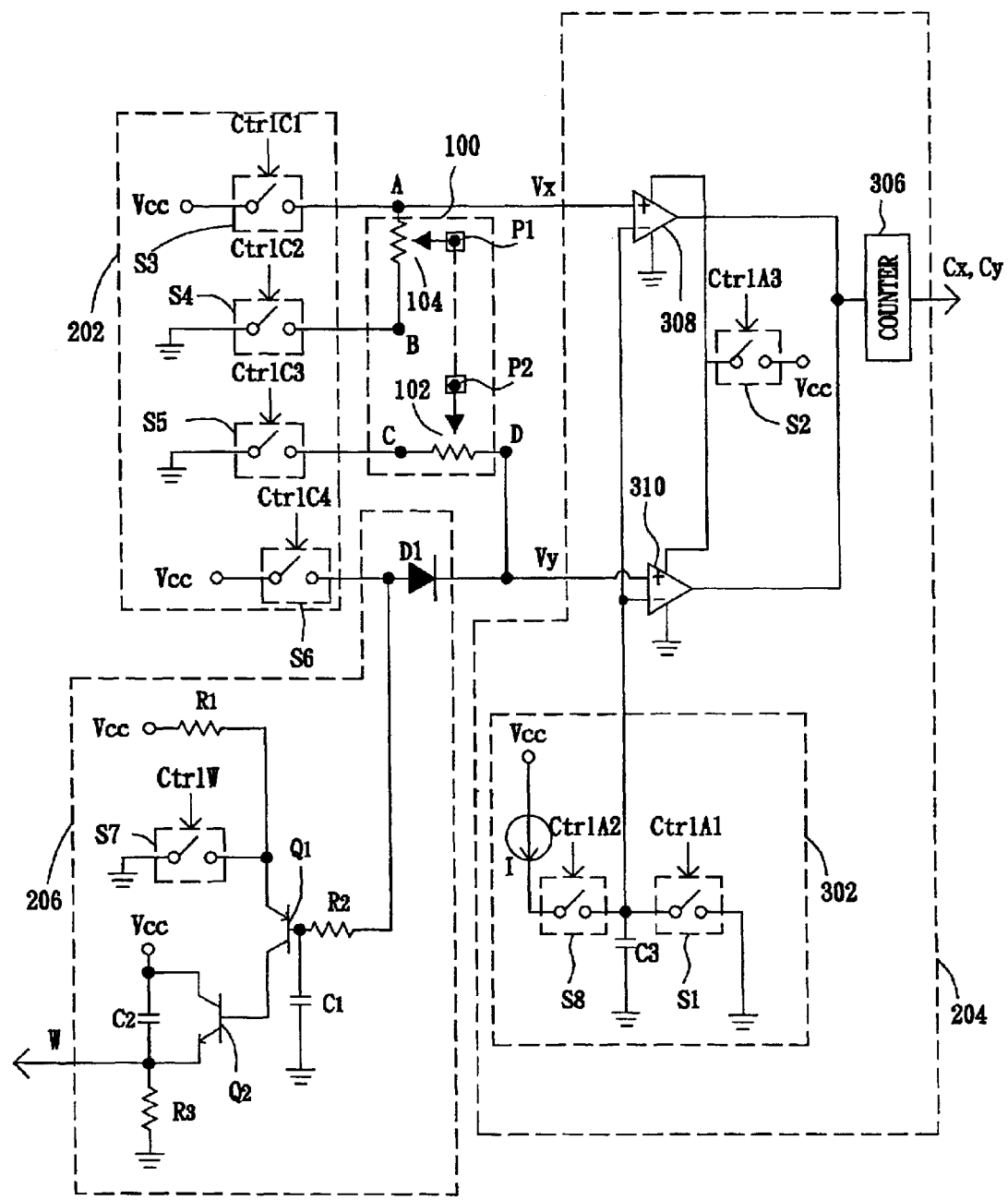
FIG. 3 is a circuitry of the detection apparatus 200 shown in FIG. 2.

FIG. 3 is a circuitry of the detection apparatus 200 shown in FIG. 2, wherein the central processor 208 and the power control unit 210 are not shown while the X-layer 102 and Y-layer 104 of the touch pad 100 can be represented by variable resistors.

The wake-up unit 206 includes a wake-up capacitor C1, a P-type transistor Q1, an N-type transistor Q2, an output capacitor C2, a wake-up switch S7, a diode D1, resistors R1, R2, and R3. The base of the P-type transistor is coupled to a first terminal of the wake-up capacitor C1 and one terminal of the resistor R2. The emitter of the P-type transistor Q1 is coupled to one terminal of the resistor R1. The resistor R1 has another terminal coupled to the DC voltage source Vcc. Another terminal of the resistor R2 is coupled to the coordinate detecting unit 202. The wake-up capacitor C1 has a second terminal coupled to a ground, for controlling the P-type transistor Q1 as so to be turned on or off. The base of the N-type transistor Q2 is coupled to the collector of the P-type transistor Q1. The collector of the N-type transistor Q2 is coupled to the DC voltage source Vcc. The emitter of the N-type transistor Q2 is coupled to the resistor R3 and another terminal of the resistor R3 is coupled to the ground. The emitter of the N-type transistor Q2 is used as an output terminal for the wake-up unit 206 to output the wake-up signal W. The wake-up switch S7 is coupled between the emitter of the P-type transistor and the ground. The wake-up switch S7 is controlled by the wake-up control signal CtrlW. The output capacitor C2 is coupled between the collector and emitter of the N-type transistor Q2.

The coordinate detecting unit 202 includes a Y power switch S3, a Y grounded switch S4, an X power switch S6, and an X grounded switch S5, under the control of the coordinate control signals CtrlC1, CtrlC2, CtrlC3, and CtrlC4, respectively. One terminal of the Y power switch S3 is coupled to the DC voltage source Vcc while another terminal of the Y power switch S3 is coupled to the first terminal A of the Y-layer 104, wherein the voltage of the first terminal A is the X-coordinate voltage Vx from the coordinate detecting unit 202. One terminal of the X power switch S6 is coupled to the DC voltage source Vcc while another terminal of the X power switch S6 is coupled to the positive terminal of a diode D1 and the wake-up unit 206. The negative terminal of the diode D1 and the first terminal D of the X-layer 102 are coupled, wherein the voltage of the first terminal D is the Y-coordinate voltage Vy from the coordinate detecting unit 202. The Y grounded switch S4 is coupled between the second terminal B of the Y-layer 104 and the ground. The X grounded switch is coupled between the second terminal C of the X-layer 102 and the ground.

The analog-to-digital converting unit 204 includes a reference voltage generator 302, a compare switch S2, a Y comparator 310, an X comparator 308, and a timer 306. The reference voltage generator 302 is used for outputting a reference voltage, wherein the reference voltage is a linear function of time. The Y comparator 310 is used for comparing the Y-coordinate voltage Vy and the reference voltage and has a positive input terminal and a negative input terminal. The negative input terminal of the Y comparator 310 is coupled to the reference voltage generator 302 so as to receive the reference voltage while the positive input terminal of the Y comparator 310 is coupled to the first terminal D of the X-layer 102 to receive the Y-coordinate voltage Vy. When the positive input terminal has a voltage larger than that of the negative input terminal, the Y comparator 310 outputs a first voltage. When the positive input terminal has a voltage smaller than that of the negative input terminal, the Y comparator outputs a second voltage. The X comparator 308 is used for comparing the X-coordinate voltage Vx and the reference voltage. The positive input terminal of the X comparator 308 is coupled to the first terminal A of the Y-layer 104 to receive the X-coordinate voltage Vx while the negative input terminal of the X comparator 308 is coupled to the reference voltage generator 302 to receive the reference voltage. When the positive input terminal of the X comparator 308 has a voltage larger than that of the negative input terminal of the X comparator 308, the X comparator 308 outputs the first voltage. When the positive input terminal of the X comparator 308 has a voltage smaller than that of the negative input terminal, the X comparator 308 outputs the second voltage. The output terminals of the X comparator 308 and Y comparator 310 are coupled to the timer 306. The X comparator 308 and Y comparator 310 are powered are powered by the DC voltage source Vcc via a switch S2, where the switch S2 is selectively switching according to the conversion control signal CtrlA3.

The timer 306 is coupled to the output terminals of the X and Y comparators 308 and 310. When the reference voltage generator 302 begins to output the reference voltage, the central processor 208 causes the timer 306 to begin clocking.

On receiving an output voltage from the comparators changes from the first voltage to the second voltage, the timer 306 stops clocking, thereby obtaining a measured time indicative of a relative digital coordinate, that is, Cx or Cy. The measured time indicates the Y-coordinate when the coordinate detecting device 202 outputs the Y-coordinate voltage. The measured time indicates the X-coordinate when the coordinate detecting device 202 outputs the X-coordinate voltage.

The reference voltage generator 302 includes a current source I, a compare capacitor C3, a discharge switch S1, and a charge switch S8. The discharge switch S1 and charge switch S8 are under the control of the conversion control signals CtrlA1 and CtrlA2 respectively. The current source I is used for providing a constant current. The first terminal of the compare capacitor C3 is coupled to the current source through the charge switch S8 while the second terminal of the compare capacitor C3 is coupled to the ground. In addition, the first terminal of the compare capacitor C3 is used as the output terminal of the reference voltage generator 302. When the charge switch S8 is turned on, the current source I charges the compare capacitor C3 while the first terminal of the compare capacitor C3 has a linearly increased voltage, wherein this voltage is the reference voltage of the reference voltage generator 302. The discharge switch S1 has one terminal connected to the first terminal of the compare capacitor C3 while the other terminal can be coupled to the ground, for example, via a resistor. When the discharge switch S1 is turned on, the compare capacitor C3 begins to discharge.

When the detection apparatus 200 enters the sleep mode, the central processor 208 causes the Y grounded switch S4 to turn on and the other switches are turned off. The central processor 208 then goes to the sleep mode. When the user touches the touch pad 100, a point PI on the X-layer 102 is in contact with a point P2 on the Y-layer 104 at a touch point, thus causing the wake-up capacitor C1 to be discharged via the touch point. When the wake-up capacitor C1 has a voltage smaller than a threshold voltage, the P-type transistor Q1 is turned on so as to turn on the N-type transistor Q2. At that time, the wake-up signal W from the wake-up unit 206 changes from the second level to the first level, thus waking up the central processor 208. Next, the central processor 208 turns on the wake-up switch S7 so that the P-type transistor Q1 is turned off, resulting in the wake-up signal W changing to the second level.

The detection apparatus 200 is required to determine whether the user touches the touch pad 100. The central processor 208 controls the coordinate detecting unit 202 by the following steps. First, the X grounded switch S5, the Y grounded switch S4, and the Y power switch S3 are turned on. If the first terminal D of the X-layer 102 has a voltage of zero, it is to turn off the Y power switch S3 and turn on the Y grounded switch S4, the X grounded switch S5, and the X power switch S6 so as to check whether the first terminal A of the Y-layer 104 has a voltage of zero. If so, it indicates that the user does not touch the touch pad.

When the detection apparatus 200 detects that the user has touched the touch pad 100, it is required to determine the Y-coordinate of the touch point indicated by the points P1 and P2. The central processor 208 controls the coordinate detecting unit 202 and the analog-to-digital converting unit 204 of detection apparatus 200 by the following steps. First, the discharge switch S1 is turned on so as to cause the compare capacitor C3 to discharge. When the compare capacitor C3 is fully discharged, the Y grounded switch S4 and the Y power switch S3 is to be turned on. Since the X-layer 102 has no current flowing through it, the voltage at the point PI on the Y-layer 104, that is, the Y-coordinate voltage Vy, can be measured and outputted. Next, the discharge switch S1 is turned off, and the charge switch S8 and the compare switch S2 are turned on while the timer 306 is caused to begin clocking. When the output voltage of the Y comparator 310 changes from the first voltage to the second voltage, the timer 306 is stopped from clocking, resulting in a measured time indicative of the Y-coordinate Cy (in digital form).

When the detection apparatus 200 detects that the user has touched the touch pad 100, it is required to determine the X-coordinate of the touch point indicated by the points P1 and P2. The central processor 208 controls the coordinate detecting unit 202 and the analog-to-digital converting unit 204 of detection apparatus 200 by the following steps. First, the discharge switch S1 is turned on so as to cause the compare capacitor C3 to discharge. When the compare capacitor C3 is fully discharged, the X grounded switch S5 and the X power switch S6 is to be turned on. Since the Y-layer 104 has no current flowing through it, the voltage at the point P2 on the X-layer 102, that is, the X-coordinate voltage Vx, can be measured and outputted. Next, the discharge switch S1 is turned off, and the charge switch S8 and the compare switch S2 are turned on while the timer 306 is caused to begin clocking. When the output voltage of the X comparator 308 changes from the first voltage to the second voltage, the timer 306 is stopped from clocking, resulting in a measured time indicative of the X-coordinate CX (in digital form).

The detection apparatus 200 is also capable of detecting whether the connection to the touch pad 100 is correct. When the X-coordinate measured is equal to an upper threshold, it indicates that the Y-layer 104 may be improperly coupled to the detection apparatus 200 because the Y-layer 104 malfunctions or looses. The upper threshold is indicative of the time period between the time that the reference voltage generator 302 starts to output the reference voltage and the time that the reference voltage exceeds the DC voltage source Vcc. When the positive input terminal of the comparator is floating, this positive input terminal has a DC voltage equal to Vcc substantially according to the characteristics of the comparator. Since the user will not touch the border of the touch pad, if the X-coordinate measured is equal to this upper threshold, it indicates that floating occurs in the positive input terminal of the comparator. Likewise, when the Y-coordinate measured is equal to an upper threshold, it indicates the X-layer 102 may be improperly coupled to the detection apparatus 200 because the X-layer 102 malfunctions or looses.

By the invention, a detection method is further provided to detect an action which a user performs on the touch pad by a touch point on the touch pad. The action may be one of a set of actions including a movement, a click, a double click, and a drag motion. The movement indicates that the user causes the touch point to move from one position to another position. The click, composed of a depression event and a release event, indicates that the user touches the touch pad for one time. The double click indicates that the user touches the touch pad for two times within an action time. The drag motion indicates that the user performs the click and then the movement within the action time. The touch pad has a sleep mode and an operative mode. If the touch pad is in the sleep mode and the user touches the touch pad, the touch pad changes from the sleep mode to the operative mode and begins detecting the action that the user performs on the touch pad.

Figure 4:
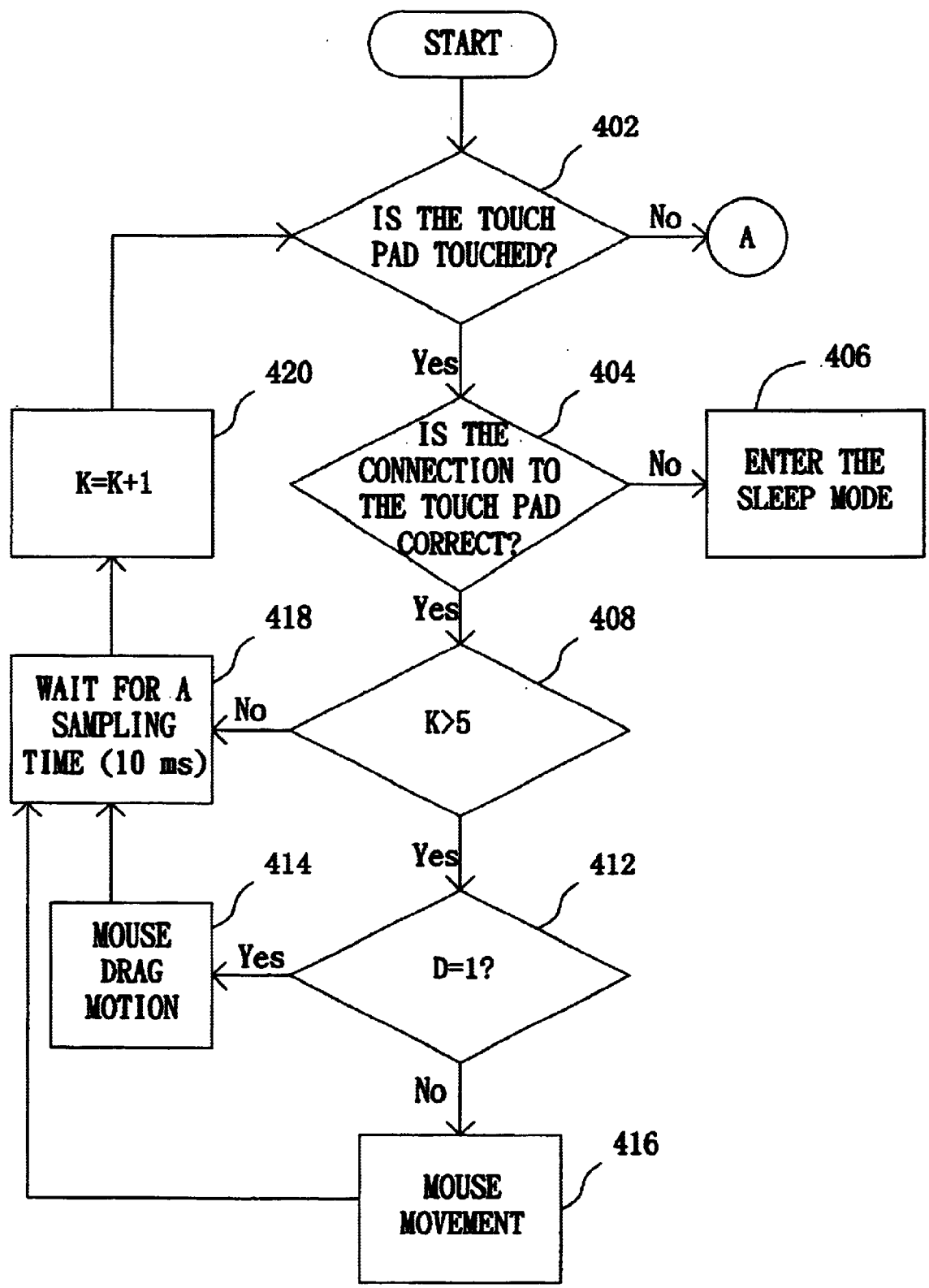
FIG. 4 is a flowchart illustrating a method for detection for use in a touch pad according to the invention.

FIG. 4 is a flowchart illustrating the detection method for use in the touch pad. When the touch pad is in an initial state, the touch pad is configured to be in the sleep mode while k is set to one and D is set to zero, where k and D are positive integers. When the user touches the touch pad, the touch pad changes from the sleep mode to the operative mode, and the detection method performs the following steps. First, the method proceeds to step 402 as to determine whether the touch pad is touched. If so, the method proceeds to step 404. If not, the method proceeds to node A so as to perform a key depression detection procedure; which will be described later in the description. In step 404, it is determined whether the touch pad is connected properly. If so, the method proceeds to step 408; otherwise, proceeding to step 406. In step 408, it is determined whether k is greater than a predetermined number. If so, the method proceeds to step 412; otherwise, proceeding to step 418. In step 406, k is set to one, D is set to zero, and the touch pad is then caused to enter the sleep mode. In step 412, it is determined whether D is equal to one. If so, the method proceeds to step 414; otherwise, proceeding to step 416. In step 414, it is to announce that the action by the user is the drag motion and then the method proceeds to step 418. In step 416, it is to announce that the action is the movement. Then, the method proceeds to step 418. In step 418, it is to wait for a sampling time. When the sampling time elapses, the method proceeds to step 420. In step 420, k is incremented by one and the method proceeds to step 402.

Figure 5:
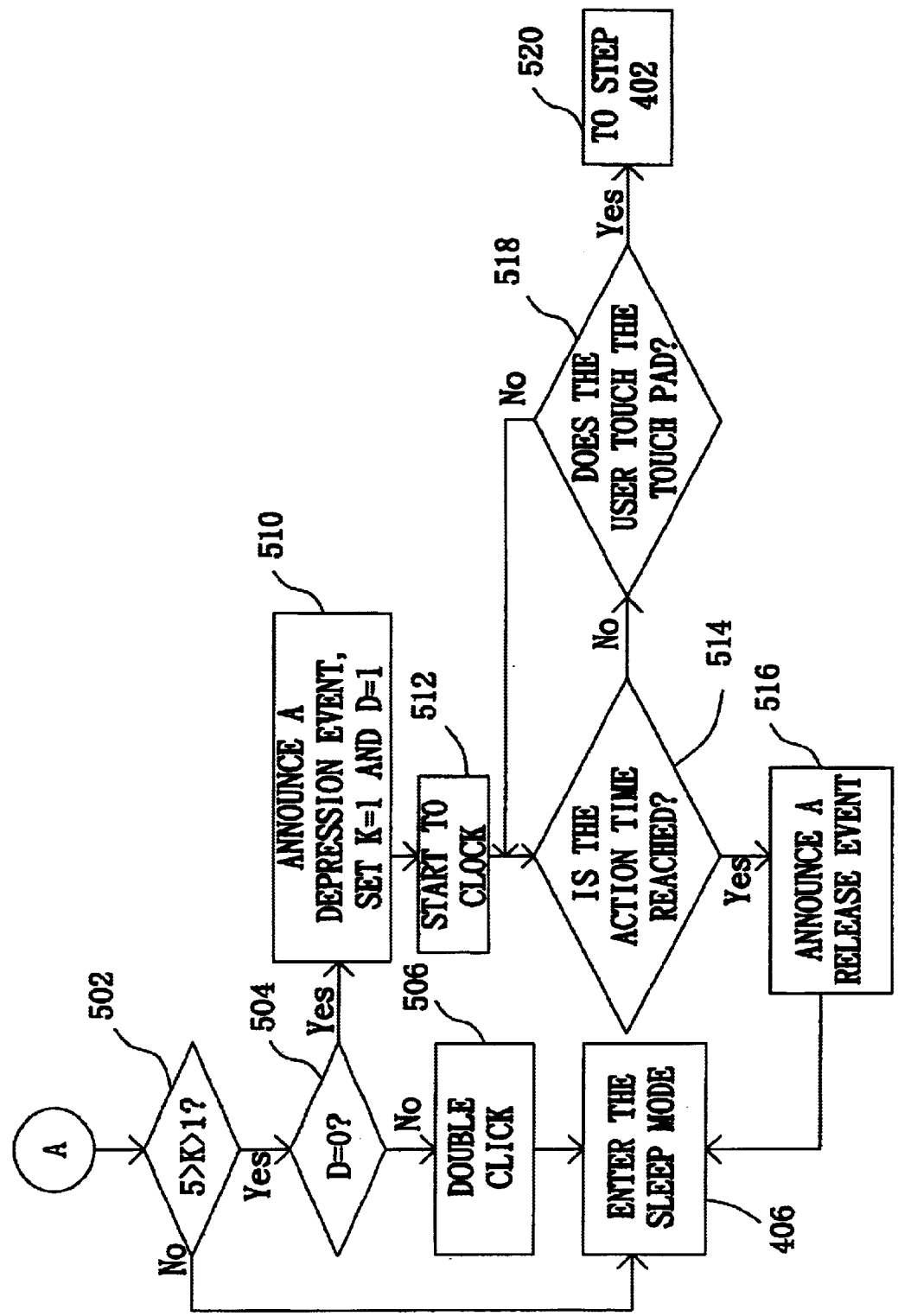
FIG. 5 is a flowchart illustrating a procedure of checking clicking indicated by node A shown in FIG. 4.

The key depression detection procedure mentioned above is illustrated in a flowchart in FIG. 5. The procedure begins from step 502. In step 502, it is determined whether k is greater than one and less than the predetermined number. If so, the procedure goes to step 504; otherwise, proceeding to step 406. In step 504, it is determined whether D is equal to zero. If so, the procedure proceeds to step 510. If not, it proceeds to step 506. In step 506, it is to announce that the action is the double click and then the procedure proceeds to step 406. In step 510, the depression event is announced, and k and D are set to one. Next, step 512 is performed. In step 512, it begins to clock and the procedure proceeds to step 514. In step 514, it is determined whether the action time is reached. If so, the procedure proceeds to step 516; otherwise, proceeding to step 518. In step 516, the release event is announced, which indicates the completion of the click. The procedure then goes to step 406. In step 518, it is determined whether the user touches the touch pad. If so, the procedure goes to step 520 so as to proceed from step 402. If not, the procedure proceeds to step 514.

In one embodiment using the above-described detection method, the predetermined number is set to five, the sampling time is set to 10 ms, and the action time is set to 0.5 second. The predetermined number, the sampling time, and the action time are adjustable for different system and preferences of users In addition, although the resistive touch pad is employed in the above embodiment, the invention can be applied to other kind of touch pads.

By the detection apparatus and method for a touch pad, the action that the user performs and the coordinates that the user indicates on the touch pad, can be detected. Since the sleep mode is supported, the power dissipation can be reduced. If the invention is applied to resistive touch pads, the power dissipation can be reduced more effectively. For example, when the touch pad is in the sleep mode, the current applied in the touch pad can be lower than 10 $\mu A$. Thus, the requirement for wireless touch pad operative in low power dissipation is achieved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A detection apparatus for use in a touch pad, for detecting the coordinates indicated by a user on the touch pad and the behavior of the user on the touch pad, the touch pad including an X-layer and a Y-layer, the X- and Y-layers being planar resistors, the detection apparatus having a sleep mode and an operative mode, wherein when the user touches the touch pad, the X- and Y-layers are electrically coupled at a touch point, the detection apparatus comprising:

a central processor for outputting at least a coordinate control signal, at least a conversion control signal and a wake-up control signal;

a coordinate detecting unit, coupled to a first terminal of the X-layer, a second terminal of the X-layer, a first terminal of the Y-layer, a second terminal of the Y-layer, and the central processor, for receiving the coordinate signal so as to determine an X-coordinate voltage and a Y-coordinate voltage, wherein the X- and Y-coordinate voltages correspond to the touch point;

an analog-to-digital converting unit, coupled to the coordinate detecting unit and the central processor, for receiving the conversion control signal so as to convert the X- and Y-coordinate voltages into an X-coordinate and a Y-coordinate, and to output the X- and Y-coordinate; and a wake-up unit, coupled to the coordinate detecting unit and the central processor, wherein, as the detection apparatus is in the sleep mode, when the user touches the touch pad and the X- and Y-layers are in contact with each other, the wake-up unit outputs a wake-up signal of a first level so that the detection apparatus changes from the sleep mode to the operative mode; the central processor sends the wake-up control signal so that the wake-up signal changes to a second level.

2. A detection apparatus according to claim 1, further comprising a power control unit, wherein the power control unit is coupled to the central processor, the coordinate detecting unit, and the analog-to-digital converting unit, and wherein:

when the detection apparatus changes from the operative mode to the sleep mode, the central processor sends a power control signal to the power control unit; in response to the power control signal, the power control unit outputs a power termination signal to stop a direct current (DC) voltage source from powering the coordinate detecting unit and the analog-to-digital converting unit.

3. A detection apparatus according to claim 2, wherein the wake-up unit comprises:

a wake-up capacitor, having a second terminal of the capacitor coupled to a ground;

a P-type transistor, wherein the emitter of the P-type transistor is coupled to one terminal of a first resistor, the base of the P-type transistor is coupled to a first terminal of the wake-up capacitor and one terminal of a second resistor, the first resistor has another terminal coupled to the DC voltage source, and another terminal of the second resistor is coupled to the coordinate detecting unit;

a wake-up switch, coupled between the emitter of the P-type transistor and the ground, wherein the wake-up switch is switched on when the detection apparatus is in the operative mode, and the wake-up switch is switched off when the detection apparatus is in the sleep mode;

an N-type transistor, wherein the base of the N-type transistor is coupled to the collector of the P-type transistor, the collector of the N-type transistor is coupled to the DC voltage source, a third resistor is coupled between the emitter of the N-type transistor and the ground, the emitter of the N-type transistor is used as an output terminal for the wake-up unit to output the wake-up signal; and an output capacitor coupled between the collector and emitter of the N-type transistor.

4. A detection apparatus according to claim 2, wherein the coordinate detecting unit comprises:

a Y power switch, one terminal of which is coupled to the DC voltage source, another terminal of which is coupled to the first terminal of the Y-layer and is used for selectively outputting the X-coordinate voltage, the Y power switch being controlled by a first coordinate control signal;

an X power switch, one terminal of which is coupled to the DC voltage source, another terminal of which is coupled to the first terminal of the X-layer and is used for outputting the Y-coordinate voltage, the X power switch being controlled by a second coordinate control signal;

a Y grounded switch, coupled between the second terminal of the Y-layer and the ground, the Y grounded switch being controlled by a third coordinate control signal;

an X grounded switch, one terminal of which is coupled to the second terminal of the X-layer and the wake-up unit, another terminal of which is coupled to the ground, the X grounded switch being controlled by a fourth coordinate control signal;

wherein the coordinate detecting unit outputs the Y-coordinate voltage when both the Y power switch and the Y grounded switch are turned on and both the X power switch and the X grounded switch are turned off;

the coordinate detecting unit outputs the X-coordinate voltage when both the X power switch and the X grounded switch are turned on and both the Y power switch and the Y grounded switch are turned off; and when the Y grounded switch, the Y power switch, and the X grounded switch are turned on, and the X power switch is turned off, it indicates that the user does not touch the touch pad if the Y-coordinate voltage is substantially equal to zero and if the first terminal of the Y-layer has a voltage of about zero after the Y power switch is turned off and the Y grounded switch, the X grounded switch, and the X power switch are turned on.

5. A detection apparatus according to claim 4, wherein the X power switch of the coordinate converting unit is coupled to the first terminal of the X-layer through a diode.

6. A detection apparatus according to claim 1, wherein the analog-to-digital converting unit comprises:

a reference voltage generator for outputting a reference voltage, wherein the reference voltage is a linear function of time;

a Y comparator having a Y positive input terminal and a Y negative input terminal, for comparing the Y-coordinate voltage and the reference voltage, wherein the Y positive input terminal is coupled to the first terminal of the X-layer to receive the Y-coordinate voltage, the Y negative input terminal is coupled to the reference voltage generator to receive the reference voltage, the Y comparator outputs a first voltage when the Y positive input terminal has a voltage larger than that of the Y negative input terminal, and the Y comparator outputs a second voltage when the Y positive input terminal has a voltage smaller than that of the Y negative input terminal;

an X comparator having an X positive input terminal and an X negative input terminal, for comparing the X-coordinate voltage and the reference voltage, wherein the X positive input terminal is coupled to the first terminal of the Y-layer to receive the X-coordinate voltage, the X negative input terminal is coupled to the reference voltage generator to receive the reference voltage, the X comparator outputs the first voltage when the X positive input terminal has a voltage larger than that of the X negative input terminal, and the X comparator outputs the second voltage when the X positive input terminal has a voltage smaller than that of the X negative input terminal;

a compare switch, coupled to the X comparator and the Y comparator, the compare switch being controlled by the first conversion control signal; and a timer, coupled to output terminals of the X and Y comparators, wherein the central processor causes the timer to begin clocking when the reference voltage generator begins outputting the reference voltage, the timer stops clocking and a measured time indicative of a relative digital coordinate is obtained when an output voltage from the comparator changes from the first voltage to the second voltage, the measured time indicates the Y-coordinate when the coordinate detecting device outputs the Y-coordinate voltage, and the measured time indicates the X-coordinate when the coordinate detecting device outputs the X-coordinate voltage.

7. A detection apparatus according to claim 6, wherein the reference voltage generator comprises:

a current source for providing a constant current;

a compare capacitor, wherein a first terminal of the compare capacitor is coupled to the current source, a second terminal of the compare capacitor is coupled to the ground, and the voltage at the first terminal of the compare capacitor is the output voltage of the reference voltage generator;

a charge switch coupled between the current source and the first terminal of the compare capacitor and controlled by the second conversion control signal; and a discharge switch coupled between the first terminal of the compare capacitor and the ground and controlled by the third conversion control signal.

8. A detection apparatus according to claim 1, wherein the central processor is a single chip controller.

* * * * *